US011055242B2

(12) United States Patent
Caruk et al.

(10) Patent No.: US 11,055,242 B2
(45) Date of Patent: Jul. 6, 2021

(54) RECEIVER PACKET HANDLING

(71) Applicant: ATI Technologies ULC, Markham (CA)

(72) Inventors: Gordon Caruk, Markham (CA); Jaroslaw Marczewski, Markham (CA)

(73) Assignee: ATI Technologies ULC, Markham (CA)

( * ) Notice: Subject to any disclaimer, the term of this patent is extended or adjusted under 35 U.S.C. 154(b) by 20 days.

(21) Appl. No.: 15/192,723

(22) Filed: Jun. 24, 2016

(65) Prior Publication Data

US 2016/0378702 A1 Dec. 29, 2016

Related U.S. Application Data

(60) Provisional application No. 62/186,112, filed on Jun. 29, 2015, provisional application No. 62/202,268, filed on Aug. 7, 2015.

(51) Int. Cl.
*G06F 13/36* (2006.01)
*H04L 5/00* (2006.01)
*G06F 13/42* (2006.01)

(52) U.S. Cl.
CPC .......... *G06F 13/36* (2013.01); *G06F 13/4282* (2013.01); *H04L 5/0055* (2013.01); *G06F 2213/0026* (2013.01)

(58) Field of Classification Search
CPC ............... G06F 13/36; G06F 13/4282; G06F 2213/0026; H04L 5/0055
See application file for complete search history.

(56) References Cited

U.S. PATENT DOCUMENTS

| | | | | |
|---|---|---|---|---|
| 2004/0066763 A1* | 4/2004 | Hashimoto | ............. | H04L 29/06 370/329 |
| 2006/0218556 A1* | 9/2006 | Nemirovsky | ......... | G06F 9/3851 718/104 |
| 2007/0022204 A1* | 1/2007 | Moch | ........................ | H04L 1/24 709/230 |
| 2009/0006710 A1* | 1/2009 | Daniel | ................ | G06F 9/45558 710/315 |
| 2011/0066822 A1* | 3/2011 | Ikeda | .................. | G06F 13/4059 711/170 |
| 2013/0013823 A1* | 1/2013 | Altmayer | ............... | G06F 13/385 710/33 |
| 2014/0040527 A1* | 2/2014 | Kanigicherla | ...... | G06F 13/4022 710/316 |

(Continued)

OTHER PUBLICATIONS

PCI-SIG, PCI Express Base Specification, Revision 3.1, Oct. 8, 2014, 1077 pgs., USA (Available at: https://www.slac.stanford.edu/grp/lcls/controls/docs/hw/uTCA/Standards/GB-PCI_Express_Base_r3.1_October8-2014.pdf).

*Primary Examiner* — Henry Tsai
*Assistant Examiner* — Aurangzeb Hassan
(74) *Attorney, Agent, or Firm* — Volpe Koenig

(57) ABSTRACT

Methods and devices for handling short Peripheral Component Interconnect Express (PCIe) Transaction Layer Packets (TLPs) are described. A receiver can receive at least a portion of a first packet and can process the first packet to determine if the first packet is a short packet. The receiver can receive at least a portion of a second packet and if the first packet is a short packet, the receiver can transmit a negative acknowledgement (NAK) in response to the second packet and can receive a retransmission of the second packet.

20 Claims, 6 Drawing Sheets

(56) References Cited

U.S. PATENT DOCUMENTS

| | | | |
|---|---|---|---|
| 2014/0192985 A1* | 7/2014 | Wentink | H04W 12/04 380/273 |
| 2015/0244632 A1* | 8/2015 | Katar | H04L 47/2433 370/230 |
| 2015/0264090 A1* | 9/2015 | Kim | H04L 65/1069 370/329 |
| 2017/0117757 A1* | 4/2017 | Park | H02J 50/80 |

* cited by examiner

RECEIVER PACKET HANDLING

CROSS REFERENCE TO RELATED APPLICATIONS

This application claims the benefit of U.S. provisional application No. 62/186,112 filed Jun. 29, 2015 and 62/202,268 filed Aug. 7, 2015, which are incorporated by reference as if fully set forth.

BACKGROUND

The Peripheral Component Interconnect Express (PCIe) standard is a high performance, general purpose, packetized input-output (I/O) interconnect standard. In the PCIe standard, Transaction Layer Packets (TLPs) are not defined for packet sizes of 1, 2, 3, or 4 double words (DWs). As set forth herein, the current PCIe standard refers to PCIe version 3.1 and all earlier versions, the contents of which are hereby incorporated by reference in their entirety.

BRIEF DESCRIPTION OF THE DRAWINGS

A more detailed understanding can be had from the following description, given by way of example in conjunction with the accompanying drawings wherein.

DETAILED DESCRIPTION

Figure 1:
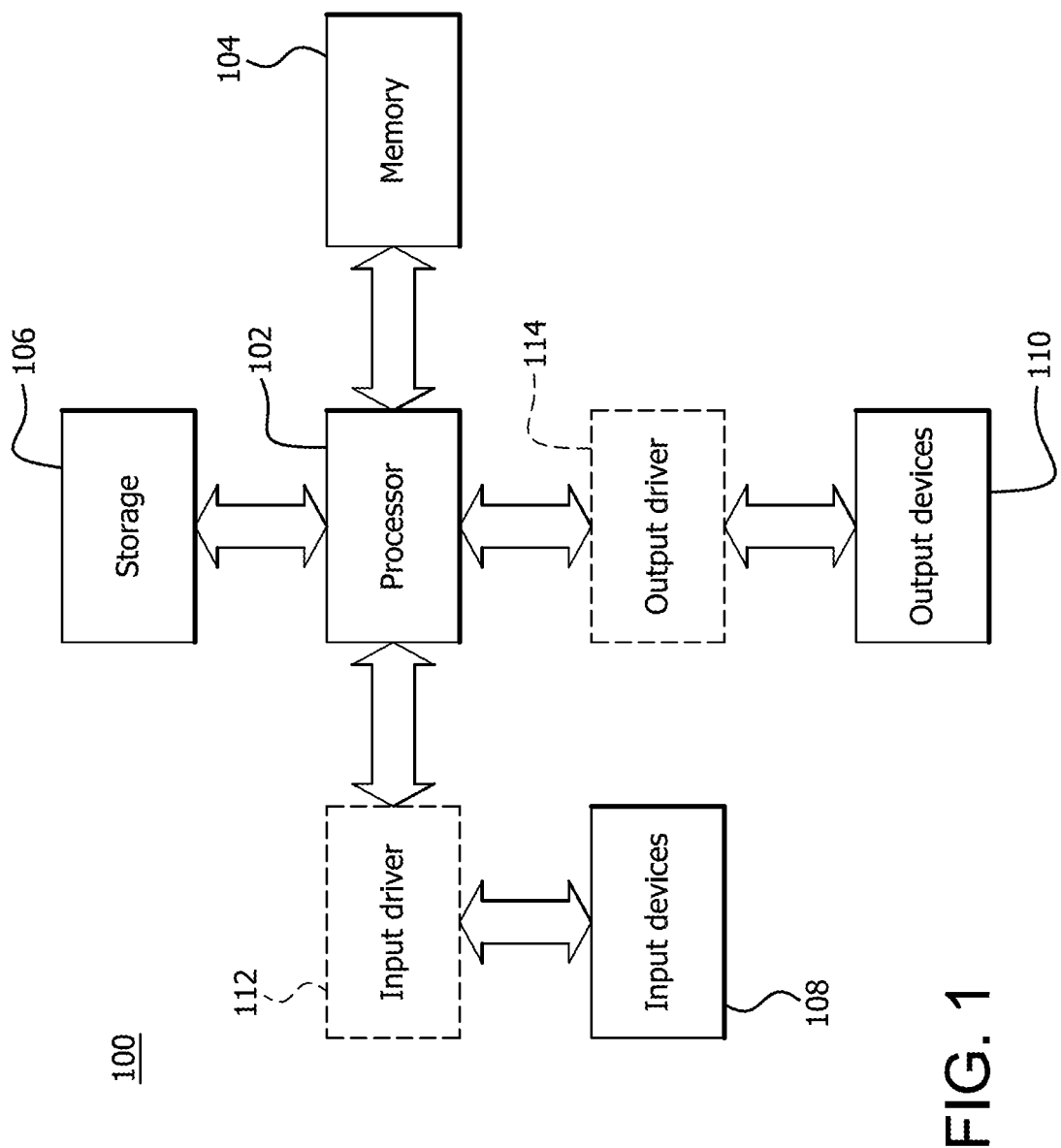
FIG. 1 is a block diagram of an example device in which one or more disclosed embodiments can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Various components of device 100 communicate among each other or with other components using an interface standard such as PCIe. For example, processor 102 communicates with storage 106 or memory 104 using a PCIe link as defined by that standard. The current PCIe standard specifies various types of packets, including Transaction Layer Packets (TLPs). The length of TLPs can be referred to in terms of a number of double words (DW). The current PCIe standard however does not define TLPs having a length of 1, 2, 3, or 4 DWs. Such packets are referred to herein as short packets. The minimum length for valid packets (i.e., which are not short packets) in the current PCIe standard is 5 DWs. It is noted that this minimum length can refer to the length of the entire packet and not to the length of a data payload. It is also noted that the minimum header size, including framing symbols, for TLPs in the current PCIe standard is 5 DWs.

In the current PCIe standard, short packets are required to be processed by a receiver even though they are not valid packets. Processing in the examples herein includes data link checks, however in some implementations processing does not include data link checks. Data link checks in the examples herein include performing a cyclic redundancy check (CRC), and/or a sequence number check, although in some implementations, data link checks include different or additional types of checks. Such checks can include data link checks as described in the PCIe standard. Thus, the receiver must continue processing the packet even if it determines that the length of the packet is invalid (i.e., 1, 2, 3, or 4 DWs). In some cases however, the link speed is high enough and/or the link width is wide enough that the receiver is required to begin processing multiple short packets during the same or overlapping time periods. It is noted that performing a CRC can be a relatively lengthy operation, and that circuitry for performing a CRC can be relatively large.

In an example case, a receiver begins to receive 16 short packets which are 1 symbol long during the same clock cycle over a ×16 width PCIe link. One approach for receiving these short packets in compliance with the current PCIe standard is to implement 16 separate packet processing circuits. However in this case, at least 16 times as much hardware might be required in order to handle short packets as might otherwise be required to handle only valid packets. Viewed from the perspective of floor planning, routing, and timing closure, this can in fact result in significantly more than 16 times as much hardware and interconnect, which can be disadvantageous in terms of cost, power dissipation, chip yield, and/or other considerations. Over wider and/or faster PCIe links, this problem can be compounded.

Another approach to handling received short packets is simply to immediately drop (i.e., throw away) such packets when identified at the receiver. However this behavior contravenes the current PCIe specification which requires processing (e.g., CRC) of all packets, and can render receivers which implement this approach non-compliant with the specification.

Another approach to handling received short packets, is to begin processing a first packet, and to transmit a negative acknowledgement (NAK) in response to a next (second) packet if it is determined that the first received packet is a short packet (the first received packet having passed data link checks).

A packet can be determined to be a short packet by parsing the incoming packet stream for start (STP) symbols. In an example approach, if a first STP is received for a first packet and then a second STP is received too soon thereafter (e.g., less than 5 DW following the first STP), the first packet is identified as a short packet on this basis. Based on this determination, a NAK is transmitted for the second packet (e.g., by the receiver) without any further determination of the size or legality of the second packet.

In this example, the receiver then receives a replay (i.e., retransmission) of the second packet for which the NAK was transmitted, and then proceeds to process the received retransmitted packet. If the received retransmitted packet is also a short packet, a NAK is transmitted for a further (third) packet. Otherwise, processing continues as usual. This can be extended for any later received short packets.

This approach can have the advantage of allowing short packets to be handled without excess or redundant packet processing hardware by delaying processing of short packets until a prior or simultaneously received short packet has been processed (and the packet processing hardware is available for the next packet). It is noted that because short packets are invalid and typically occur only in cases where delay would not impact performance during useful tasks, stalling processing using a NAK in this way might not negatively impact performance during more typical operation.

It is noted that the receiver can be configured to transmit only one NAK upon receipt of a packet following a short packet. This can reduce processing to determine whether the short packet is still being processed.

The techniques discussed above can also be applied to scenarios other than the receipt of short packets. For instance, in another example, a NAK is transmitted by the receiver in response to a packet being received within a time window of a threshold number of earlier received packets, in response to receipt of a packet following receipt of an improperly formed packet (i.e., improperly formed in a way other than simply being short), or in response to a packet being received too close in time to an earlier received packet.

Figure 2:
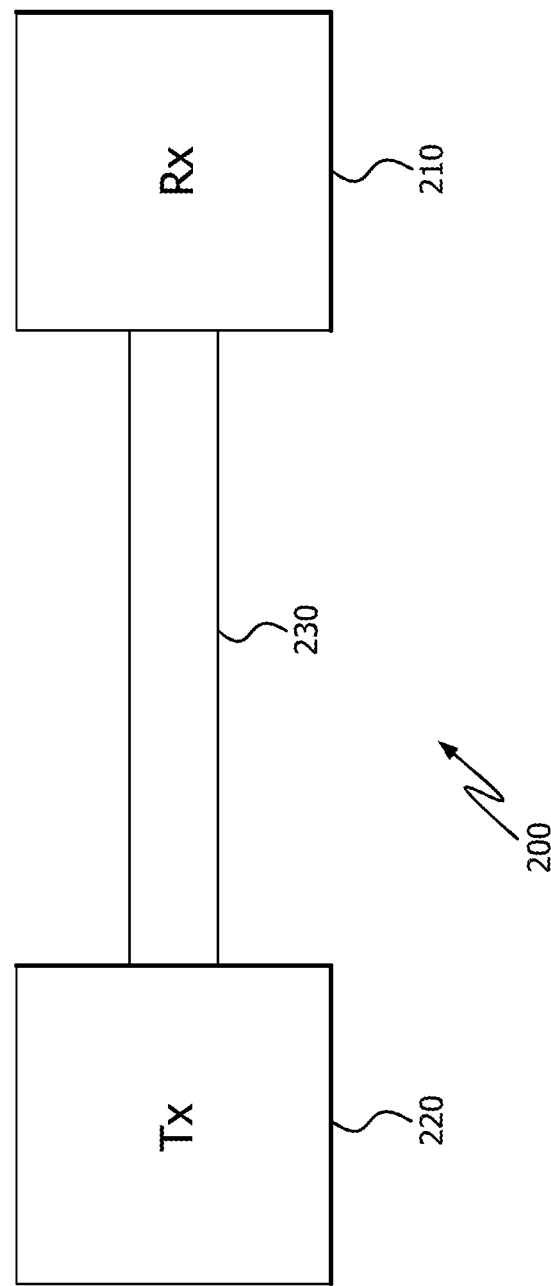
FIG. 2 is a block diagram illustrating an example system in which one or more disclosed embodiments can be implemented.

FIG. 2 is a block diagram illustrating an example system 200.

System 200 includes a receiver 210, transmitter 220, and PCIe link 230. System 200 is usable with various embodiments described herein and can be used with or include the device 100 as shown and described with respect to FIG. 1. For example, receiver 210 or transmitter 220 can be implemented using a device substantially similar to device 100.

Receiver 210 is a receiving device configured to receive data according to a PCIe standard, such as the current PCIe standard or any successor version of the PCIe standard. Receiver 210 includes circuitry configured to receive packets over PCIe link 230, such as TLPs. Receiver 210 can be configured to receive any other signaling according to current or successor PCIe standards. Receiver 210 is also configured to handle improperly formed packets, short packets, or packets that otherwise do not comply with current or successor PCIe standards. For example, receiver 210 includes circuitry for determining whether a received packet is shorter than a legal PCIe TLP. Receiver 210 also includes a PCIe transmitter. In some implementations where receiver 210 does not include a PCIe transmitter, receiver 210 can be included in a device or system which also includes a PCIe transmitter.

Transmitter 220 is a transmitting device configured to transmit data according to a PCIe standard, such as the current PCIe standard or any successor version of the PCIe standard. Transmitter 220 includes circuitry configured to transmit packets over PCIe link 230, such as TLPs. Transmitter 220 can be configured to transmit any other signaling according to current or successor PCIe standards. Transmitter 220 can also be configured to or can inadvertently transmit improperly formed packets, short packets, or packets that otherwise do not comply with current or successor PCIe standards. Transmitter 220 also includes a PCIe receiver, however in implementations where transmitter 220 does not include a PCIe receiver, transmitter 220 can be included in a device or system which also includes a PCIe receiver.

Link 230 is a communications link between transmitter 220 and receiver 210, and is configured to carry data according to a PCIe standard, such as the current PCIe standard or any successor version of the PCIe standard. PCIe link 230 carries packets, such as TLPs, and also carries improperly formed packets, short packets, or packets that otherwise do not comply with current or successor PCIe standards.

Figure 3:
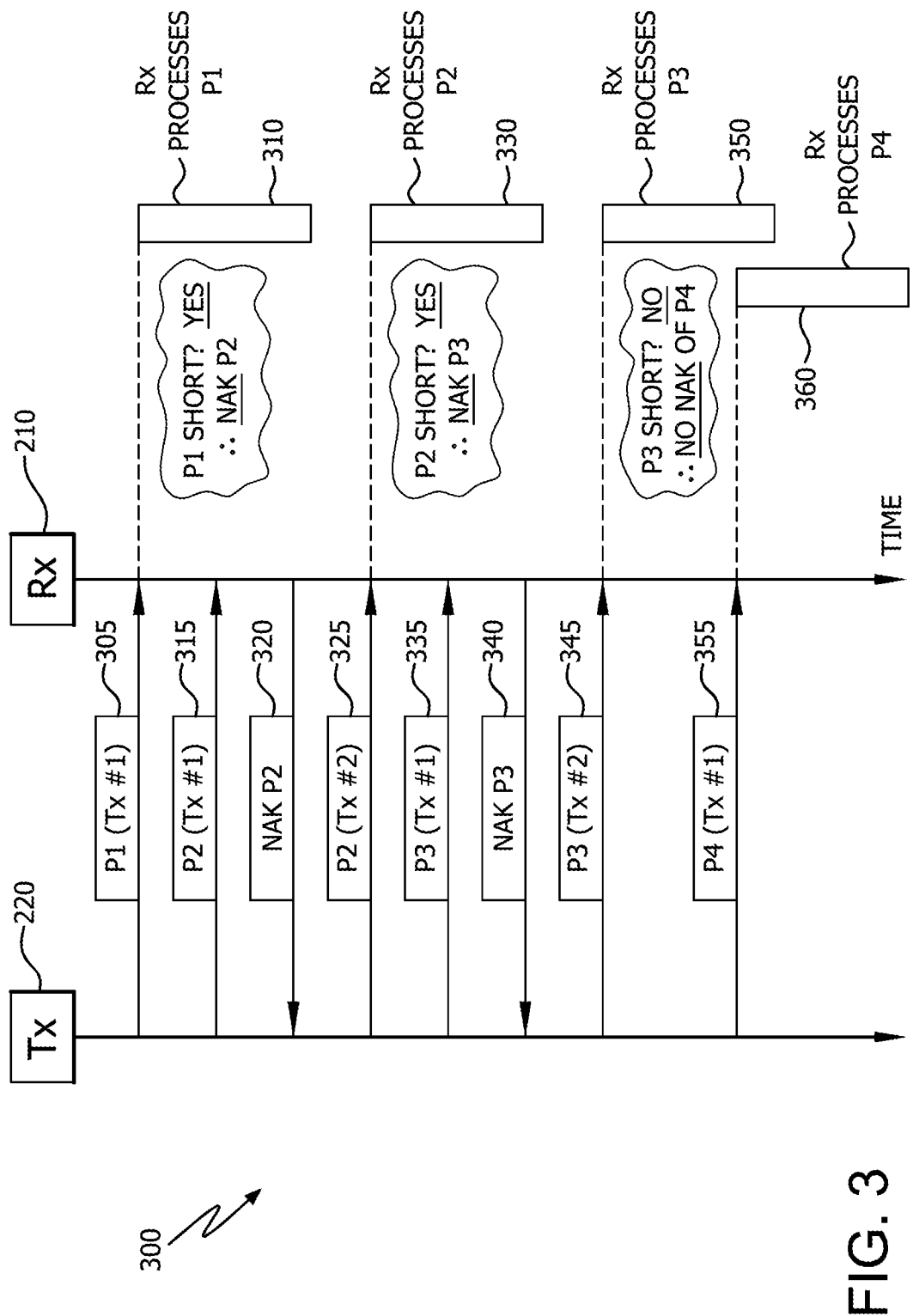
FIG. 3 is a signal diagram illustrating example signaling for the system shown in FIG. 2.

FIG. 3 is a signal diagram illustrating example signaling 300 between transmitter 220 and receiver 210 over PCIe link 230 of FIG. 2, according to various embodiments. In this example, a first TLP P1 is transmitted from transmitter 220 to receiver 210 over link 230 in a transmission 305. It is noted that while the packets, such as P1, described in example signaling 300 are TLP packets, other types of packets can be used in other implementations, and the example is also generalizable to other non-PCIe applications. Circuitry in receiver 210 determines whether P1 is a short packet (or in some implementations, determine whether P1 is an otherwise improperly formed packet), e.g., by parsing P1 for STP symbols as described above, and processes packet P1 in a processing phase 310. During the processing phase 310, a second packet P2 is transmitted from transmitter 220 to receiver 210 in a transmission 315. In this example, receiver 210 determines that P1 is a short packet that passes data link checks, and transmits, (e.g., immediately or shortly thereafter, or after completion of the data link checks) a NAK transmission 320 to transmitter 220 in response to second packet P2, regardless of whether P2 is or is not a valid packet, and without needing to further process P2. It is noted that receiver 210 can be implemented so as to determine that P1 is a short packet prior to the completion of, or independently of, processing phase 310. After receiving the NAK transmission 320, transmitter 220 retransmits P2 to the receiver in a retransmission 325. During the interim (or immediately), receiver 210 completes processing of P1 in processing phase 310.

Receiver 210 then repeats this process for P2 by first determining whether P2 is a short packet (or in some implementations, determine whether P2 is an otherwise improperly formed packet) e.g., by parsing P2 for STP symbols as described above, and processes packet P2 in a processing phase 330. During the processing phase 330, a third packet P3 is transmitted from transmitter 220 to receiver 210 in a transmission 335. In this example, receiver 210 determines that P2 is a short packet after receiving retransmission 325, and transmits (e.g., immediately or shortly thereafter) a NAK transmission 340 to transmitter 220 in response to third packet P3, regardless of whether P3 is or is not a valid packet, and without needing to further process P3. It is noted that receiver 210 can be implemented so as to determine that P2 is a short packet prior to the completion of, or independently of, processing phase 310. After receiving the NAK transmission 340, transmitter 220 retransmits P3 to the receiver in a retransmission 345. During the interim (or immediately), receiver 210 completes processing of P2 in processing phase 330. Receiver 210 can then repeat this process for P3 by first determining whether P3 is a short packet, (or in some implementations, determine whether P3 is an otherwise improperly formed packet) e.g., by parsing P3 for STP symbols as described above, and process packet P3 in a processing phase 350. During the processing phase 350, a fourth packet P4 is transmitted from the transmitter 220 to receiver 210 in a transmission 355. In this example, receiver 210 determines that P3 is a valid packet (e.g., not a short packet, or not an otherwise improperly formed packet) after receiving retransmission 345 and accordingly begins receiving the next packet P4 (and begins processing P4 in a processing phase 360) while continuing to process P3 (e.g., by completing CRC of P3) in processing phase 350.

Although example signaling 300 was described primarily with respect to detecting short packets, it is noted that detection of other kinds of improperly formed packets can also be used to determine whether to NAK subsequent transmissions. It is noted that various permutations of the signaling shown in FIG. 3 are possible consistent with the description herein.

Figure 4:
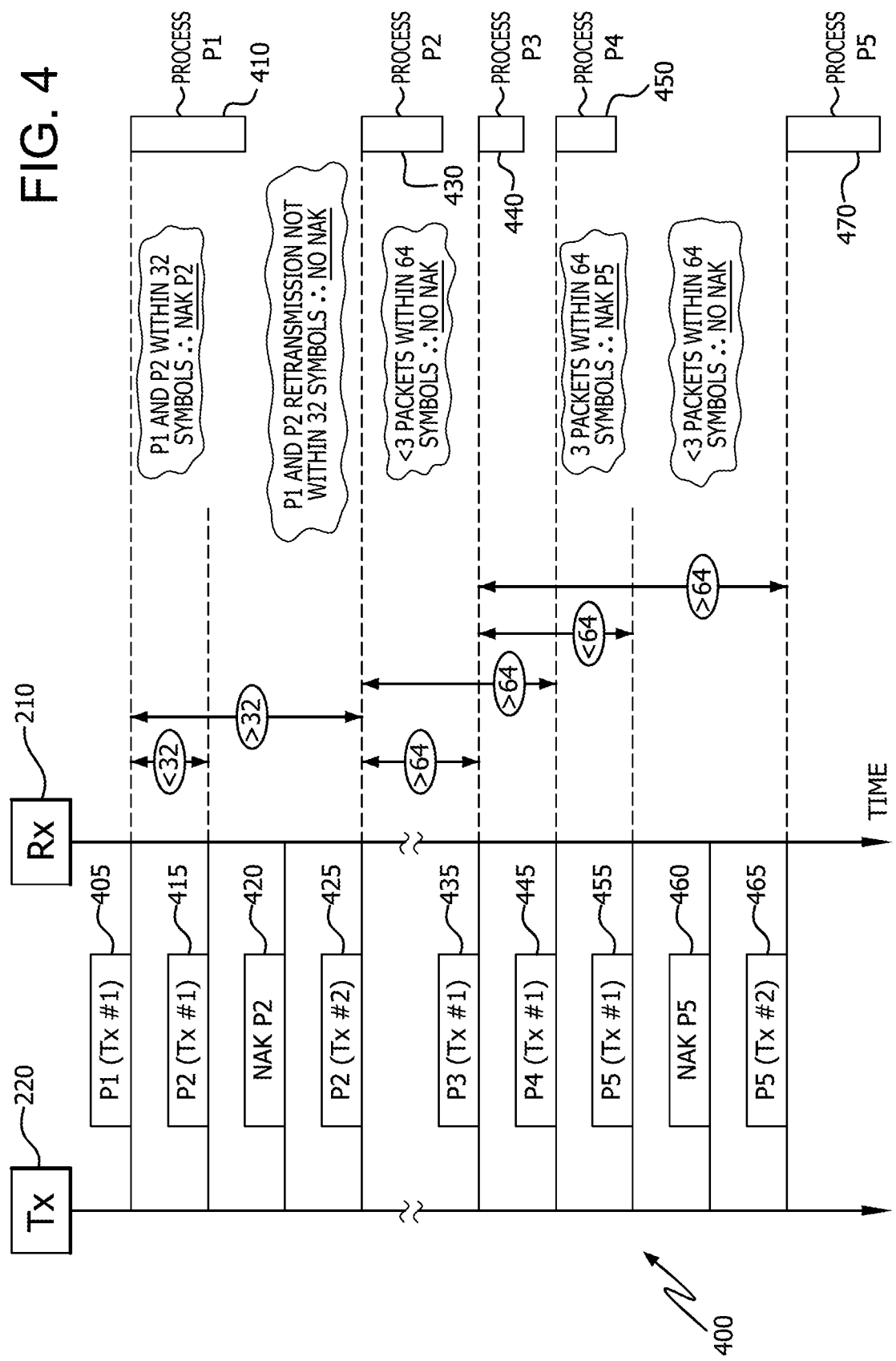
FIG. 4 is a signal diagram illustrating example signaling for the system shown in FIG. 2.

FIG. 4 is a signal diagram illustrating example signaling 400 between transmitter 220 and receiver 210 over PCIe link 230 of FIG. 2, according to various embodiments. In this example, a first TLP P1 is transmitted from transmitter 220 to receiver 210 over link 230 in a transmission 405. It is noted that while the packets, such as P1, described in example signaling 400 are TLP packets, other types of packets can be used in other implementations, and the example is generalizable to other non-PCIe applications. Circuitry in receiver 210 processes packet P1 in a processing phase 410. Thereafter, a second packet P2 is transmitted from transmitter 220 to receiver 210 in a transmission 415. Receiver 210 determines whether P2 transmission 415 arrives at receiver 210 within a threshold amount of time after P1 transmission 405 reached receiver 210. In this example, the threshold amount of time is the amount of time taken to transmit 32 symbols, where a symbol is the smallest amount of data which can be transmitted at a time over PCIe link 230, although any suitable desired amount of time (e.g., 32 or 64 symbol times) can be used as a threshold. The threshold time can be selected, for example, to be a time required to process a packet such as P1 (e.g., a minimum time, a maximum time, or some other time, such as 32, 64 or some other amount of symbol times).

In this example, receiver 210 determines that P2 transmission 415 arrived within the threshold amount of time (e.g., 32 symbol times) of P1 transmission 405. Accordingly, receiver 210 transmits (e.g., immediately or shortly thereafter) a NAK transmission 420 to transmitter 220 in response to second packet P2, without needing to further process P2.

It is noted that receiver 210 can determine that P2 arrived within the threshold time of P1 prior to the completion of, or independently of, processing phase 410. After receiving the NAK transmission 420, transmitter 220 retransmits P2 to the receiver in a retransmission 425.

Receiver 210 determines whether P2 retransmission 425 arrives at receiver 210 within a threshold amount of time after P1 transmission 405. In this example, receiver 210 determines that P2 transmission 415 arrived outside the threshold amount of time (e.g., 32 symbol times) of P1 transmission 405. Accordingly, receiver 210 receives retransmission 425 and processes packet P2 in a processing phase 430.

The signaling of packets P1 and P2 illustrate a time threshold approach to determining whether to NAK a subsequent packet. This approach can be generalized and/or modified using a time windowing approach.

For example, a third packet P3 can be transmitted from transmitter 220 to receiver 210 in a transmission 435. It is assumed for this example that the P3 transmission 435 arrives at receiver 210 long enough after any prior packet transmission (e.g., P2) not to cause receiver 210 to NAK P3. Accordingly, receiver 210 receives transmission 435 and processes packet P3 in a processing phase 440.

Thereafter, a subsequent packet P4 is transmitted from transmitter 220 to receiver 210 in a transmission 445. Receiver 210 determines whether, within a threshold time window before P4 transmission 445 arrives at receiver 210, a threshold number of packets have been received. In this example, the time window is 64 symbol times, and the threshold number of packets is 3, however it is noted that any suitable time window and/or threshold number of packets can be used. Receiver 210 determines that within a 64 symbol time window prior to P4 transmission 445 arriving, only one other packet has been received (i.e., P3). It is assumed for this example that P2 transmission 425 was received more than 64 symbol times prior to P4 transmission 445. Accordingly, receiver 210 receives P4 transmission 445 and processes packet P4 in a processing phase 450

Thereafter, a subsequent packet P5 is transmitted from transmitter 220 to receiver 210 in a transmission 455. Receiver 210 determines whether, within the threshold time window of 64 symbol times prior to P4 transmission 445 arriving at receiver 210, the threshold number of 3 packets have been received. Receiver 210 determines that within a 64 symbol time window of P5 transmission 455 arriving (including the P5 transmission), three packets have been received; i.e., packets P5, P4, and P3. Accordingly, receiver 210 transmits (e.g., immediately or shortly thereafter) a NAK transmission 460 to transmitter 220 in response to fifth packet P5, without needing to further process P5. It is noted that receiver 210 can determine that P5 arrived within a 64 symbol time window of 3 packets (P5, P4, P3) prior to the completion of, or independently of, processing phase 440 or 450. It is also noted that in some embodiments, processing phase 440 and 450 can overlap.

After receiving the NAK transmission 460, transmitter 220 retransmits P5 to the receiver in a retransmission 465. Receiver 210 determines whether, within the threshold time window of 64 symbol times prior to the P5 retransmission 465 arriving at receiver 210, the threshold number of 3 packets have been received. Receiver 210 determines that within a 64 symbol time window prior to the P5 retransmission 465 arriving, fewer than 3 packets have been received (in this case, only P4 transmission 445 and P5 retransmission 465 arrived within a 64 symbol time window, while the next prior packet P3 transmission 435 arrived outside the 64 symbol time window.) It is noted that the initial P5 transmission 455 is not counted as a packet received within the 64 symbol time window, as it was not processed. It is further noted that in some implementations, the time consumed by NAK and retransmission might necessarily be longer than the time window (64 symbol times in this case), and in such implementations it can be assumed that a retransmission following a NAK is outside the time window. Accordingly, receiver 210 begins receiving packet P5, and can begin processing P5 in a processing phase 470.

Figure 5:
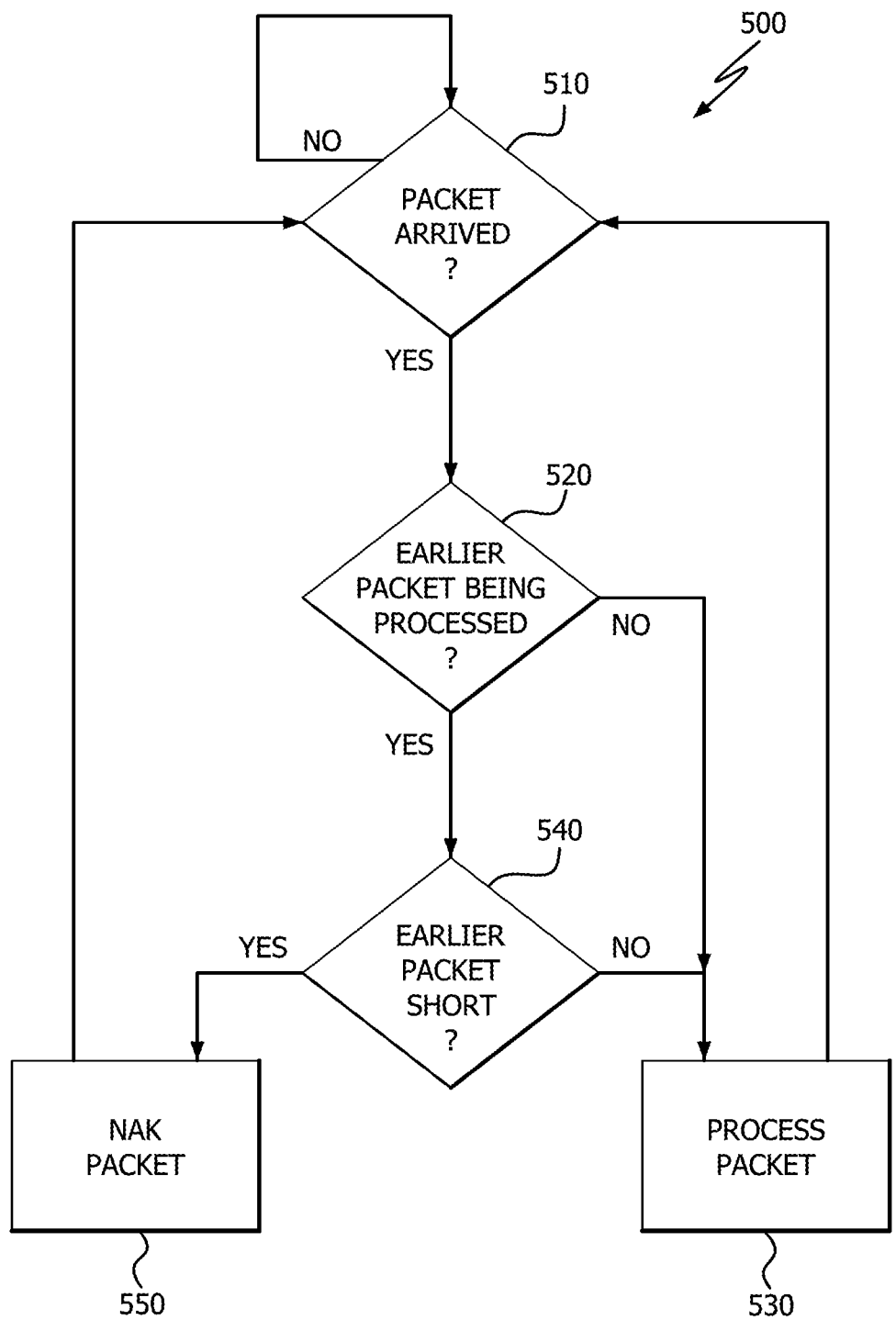
FIG. 5 is a flow chart illustrating an example method for the system shown in FIG. 2.

FIG. 5 is a flow chart illustrating an example method 500 which can be used with the system of FIG. 2 and the signaling of FIG. 3.

On a condition 510 that a packet arrives at receiver 210 via link 230, receiver 210 determines whether an earlier received packet is currently being processed. On a condition 520 that an earlier received packet is not currently being processed by receiver 210, receiver 210 begins processing the currently received packet in a step 530 and the flow returns to condition 510.

On a condition 520 that an earlier received packet is currently being processed by receiver 210, receiver 210 determines whether the currently received packet is a short packet (or an otherwise improperly formed packet). On a condition 540 that the currently received packet is a short packet (or an otherwise improperly formed packet), receiver 210 transmits a NAK to the transmitter 220 in step 550 and continues processing the earlier received packet. On a condition 540 that the currently received packet is not a short packet (or an otherwise improperly formed packet), receiver 210 continues to receive and process the currently received packet in step 530, and can also continue to process the earlier received packet.

Figure 6:
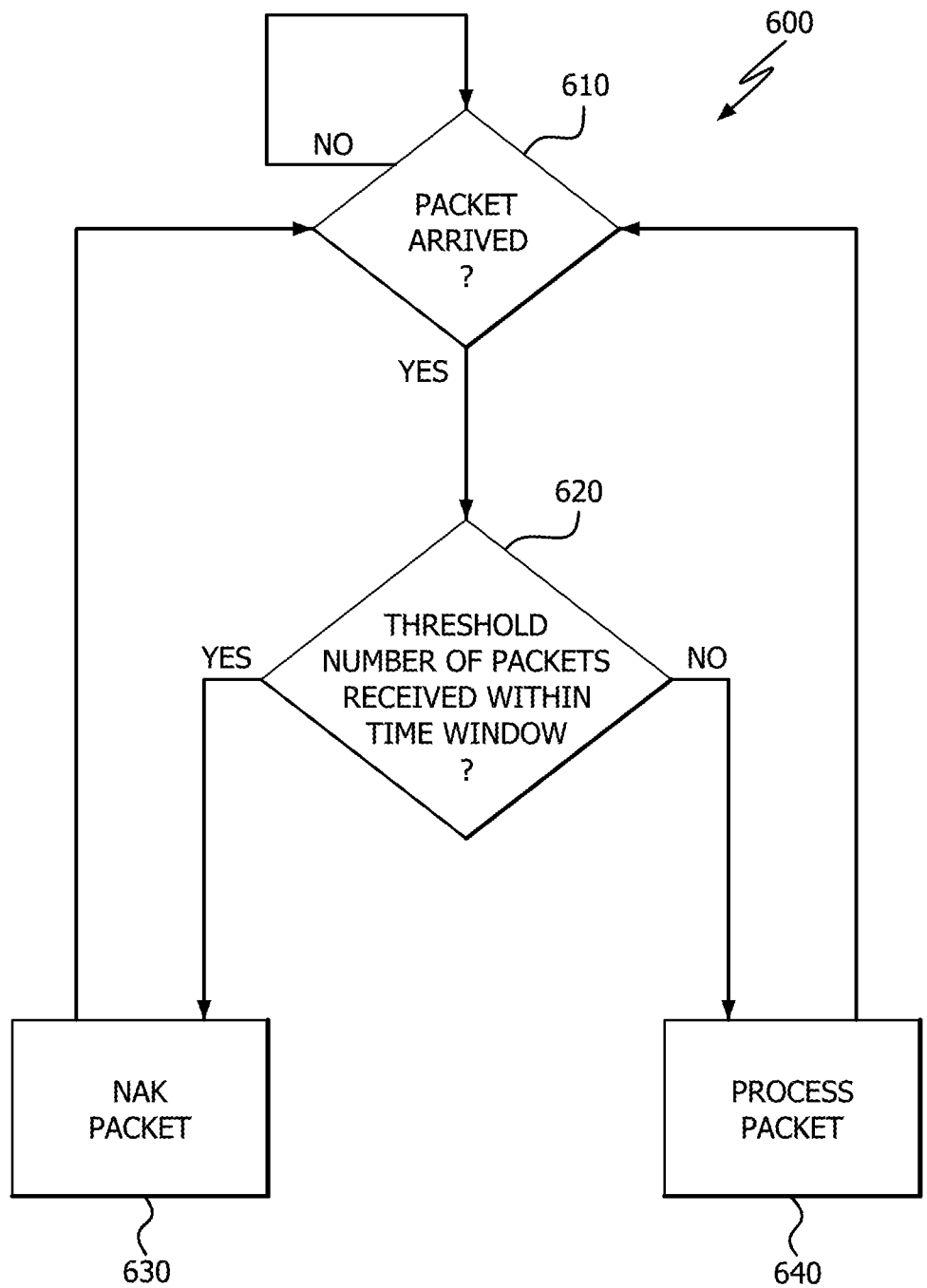
FIG. 6 is a flow chart illustrating an example method for the system shown in FIG. 2.

FIG. 6 is a flow chart illustrating an example method 600 which can be used with the system of FIG. 2 and the signaling of FIG. 4.

On a condition 610 that a packet arrives at receiver 210 via link 230, receiver 210 determines whether a threshold number of earlier packets (3 in this example, although another suitable desired number of packets can be used) was received within a time window (64 symbols in this example, although another suitable desired time window can be used) of the current packet arriving at receiver 210. On a condition 620 that the current packet arrived within the time window of the threshold number of packets, receiver 210 transmits a NAK of the current packet to transmitter 220 in a step 630, and the flow returns to condition 610.

On a condition 620 that the current packet did not arrive within the time window of the threshold number of packets, receiver 210 receives and processes the currently received packet in step 640, can also continue to process the earlier received packet if it has not yet completed processing, and the flow can return to condition 610.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for receiving communications packets by a receiver, the method comprising:
   receiving, by receiving circuitry of the receiver, at least a portion of a first packet;
   processing, by processing circuitry of the receiver, the first packet;
   receiving, by the receiving circuitry, at least a portion of a second packet;
   determining, by the processing circuitry, a period of time between receipt of the portion of the first packet and the receipt of the portion of the second packet, wherein the period of time is a variable period;
   if the period of time is less than a threshold time period:
   transmitting, by transmitting circuitry of the receiver, a negative acknowledgement (NAK) in response to the portion of the second packet without further processing of the second packet; and
   if the period of time is not less than the threshold time period:
   processing the second packet, by the processing circuitry, without transmitting the NAK in response to the portion of the second packet.

2. The method of claim 1, wherein the processing comprises determining whether the first packet passes a data link check.

3. The method of claim 1, further comprising receiving a retransmission of the second packet, in response to the NAK.

4. The method of claim 1, wherein the first packet comprises a packet having a certain length.

5. The method of claim 1, wherein the first packet is a packet of four or fewer double-words in length.

6. The method of claim 1, wherein the first packet is shorter than a Peripheral Component Interconnect Express (PCIe) Transaction Layer Packet (TLP).

7. The method of claim 1, wherein the first packet comprises an improperly formed packet.

8. The method of claim 1, wherein the first packet comprises a packet which does not comply with a PCIe packet format.

9. A receiver configured to receive communications packets, comprising:
- receiving circuitry configured to receive at least a portion of a first packet;
- processing circuitry configured to process the first packet;
- the receiving circuitry further configured to receive at least a portion of a second packet;
- the processing circuitry further configured to determine a period of time between receipt of the portion of the first packet and the receipt of the portion of the second packet, wherein the period of time is a variable period;
- transmitting circuitry configured to transmit a negative acknowledgement (NAK) in response to the portion of the second packet if the period of time is less than a threshold time period, and not to transmit the NAK in response to the portion of the second packet if the period of time is not less than the threshold time period; and
- the processing circuitry configured to process the second packet if the period of time is not less than the threshold time period, and not to process the second packet if the period of time is less than the threshold time period.

10. The receiver of claim 9, wherein the processing comprises determining whether the first packet passes a data link check.

11. The receiver of claim 9, wherein the receiving circuitry is further configured to receive a retransmission of the second packet in response to the NAK.

12. The receiver of claim 9, wherein the first packet comprises a packet having a certain length.

13. The receiver of claim 9, wherein the first packet is a packet of four or fewer double-words in length.

14. The receiver of claim 9, wherein the first packet comprises a packet which is shorter than a Peripheral Component Interconnect Express (PCIe) Transaction Layer Packet (TLP).

15. The receiver of claim 9, wherein the first packet comprises an improperly formed packet.

16. The receiver of claim 9, wherein the first packet comprises a packet which does not comply with a PCIe packet format.

17. A method for receiving communications packets by a receiver, the method comprising:
- receiving, by receiving circuitry of the receiver, at least a portion of a first packet; and
- if the first packet is received within a threshold time of an earlier received packet, wherein a period of time between receiving the first packet and the earlier received packet is a variable time period: transmitting, by transmitting circuitry of the receiver, a negative acknowledgement (NAK) in response to the first packet, without further processing the first packet; and
- if the first packet is not received within the threshold time of the earlier received packet: processing the first packet without transmitting the NAK.

18. The method of claim 17, wherein the processing comprises determining whether the first packet passes a data link check.

19. The method of claim 17, further comprising receiving a retransmission of the first packet in response to the NAK.

20. The method of claim 17, wherein transmitting the NAK is further conditioned on whether the first packet comprises a packet of a certain type.

* * * * *